United States Patent [19]

Walters

[11] 4,090,625

[45] May 23, 1978

[54] PORTABLE HYDRAULIC HOIST FOR VEHICULAR ENGINES

[76] Inventor: Jerry Walters, 7855 Fox Trot Dr., Colorado Springs, Colo. 80908

[21] Appl. No.: 758,163

[22] Filed: Jan. 10, 1977

[51] Int. Cl.² .................................................. B60P 1/48

[52] U.S. Cl. ..................................... 214/77 R; 212/55; 269/71

[58] Field of Search ................. 214/77 R, 130 R, 141, 214/1 D; 212/55, 44, 45; 269/17, 71, 73; 254/134

[56] References Cited

U.S. PATENT DOCUMENTS

| | | | |
|---|---|---|---|
| 2,672,990 | 3/1954 | Sundin | 212/55 |
| 2,827,690 | 3/1958 | Brown | 269/71 |
| 3,018,005 | 1/1962 | Renshaw | 212/55 |
| 3,059,785 | 10/1962 | Buckeye | 214/1 D |
| 3,797,675 | 3/1974 | Moore | 214/1 D |
| 3,814,413 | 6/1974 | Bopp | 269/71 |
| 4,021,017 | 5/1977 | Adams | 254/134 |

*Primary Examiner*—Drayton E. Hoffman
*Assistant Examiner*—Ross Weaver
*Attorney, Agent, or Firm*—W. Britton Moore

[57] ABSTRACT

A portable vehicle engine handling hydraulic hoist including a wheeled base for mounting a vertically and swingable base boom with a tiltable and longitudinally movable horizontal boom pivoted to the upper end thereof. A nose pivoted to the outer end of the horizontal boom includes a shaft for carrying an engine supporting sling having spaced arms for bolting connection to the engine. A self-contained electric motor, hydraulic pump and oil reservoir are arranged on the base and connected by hydraulic lines to a control panel with control selectors adapted to be handled by the operator for selectively hydraulically actuating hydraulic cylinders in and connected to the booms and the horizontal boom nose and engine sling mounting shaft whereby an engine requiring repair may be readily disconnected from its motor mounts and transmission and so manipulated with precision and removed from a vehicle within the close confines of a stall in a repair shop and replaced when repaired or another engine installed.

9 Claims, 11 Drawing Figures

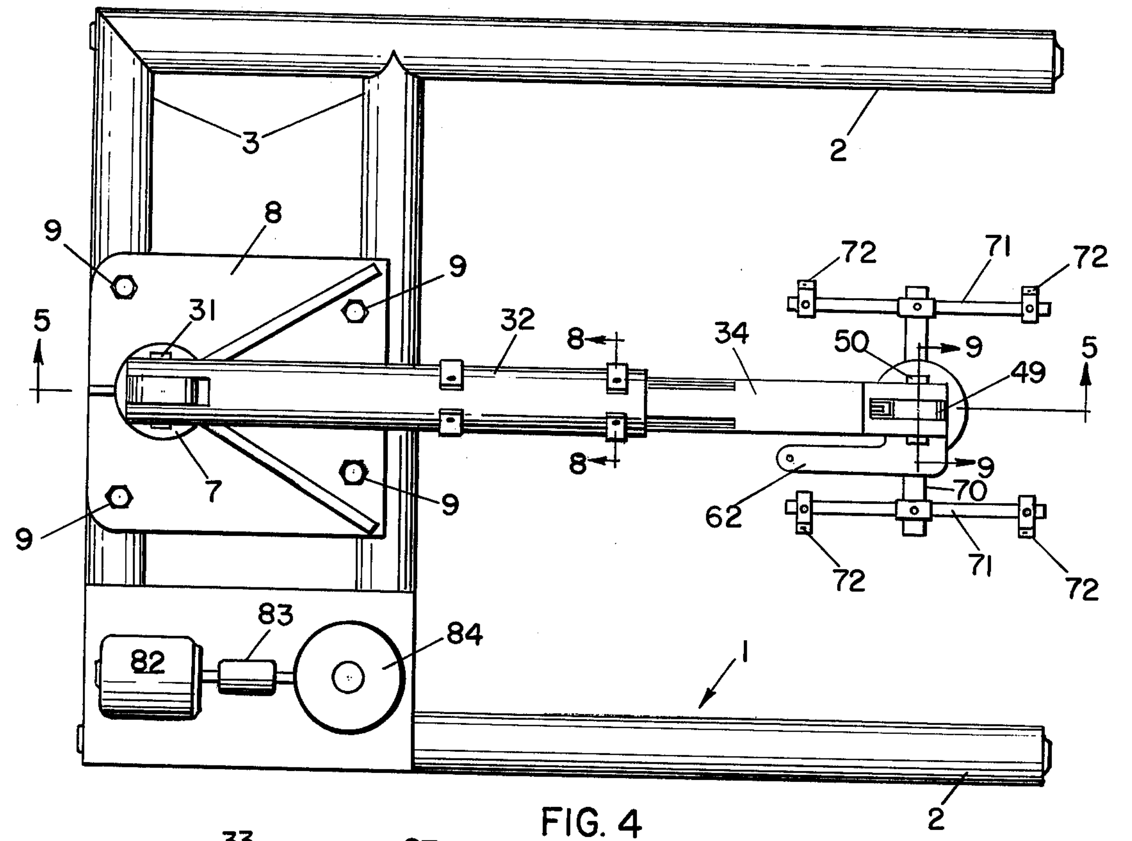
FIG. 4
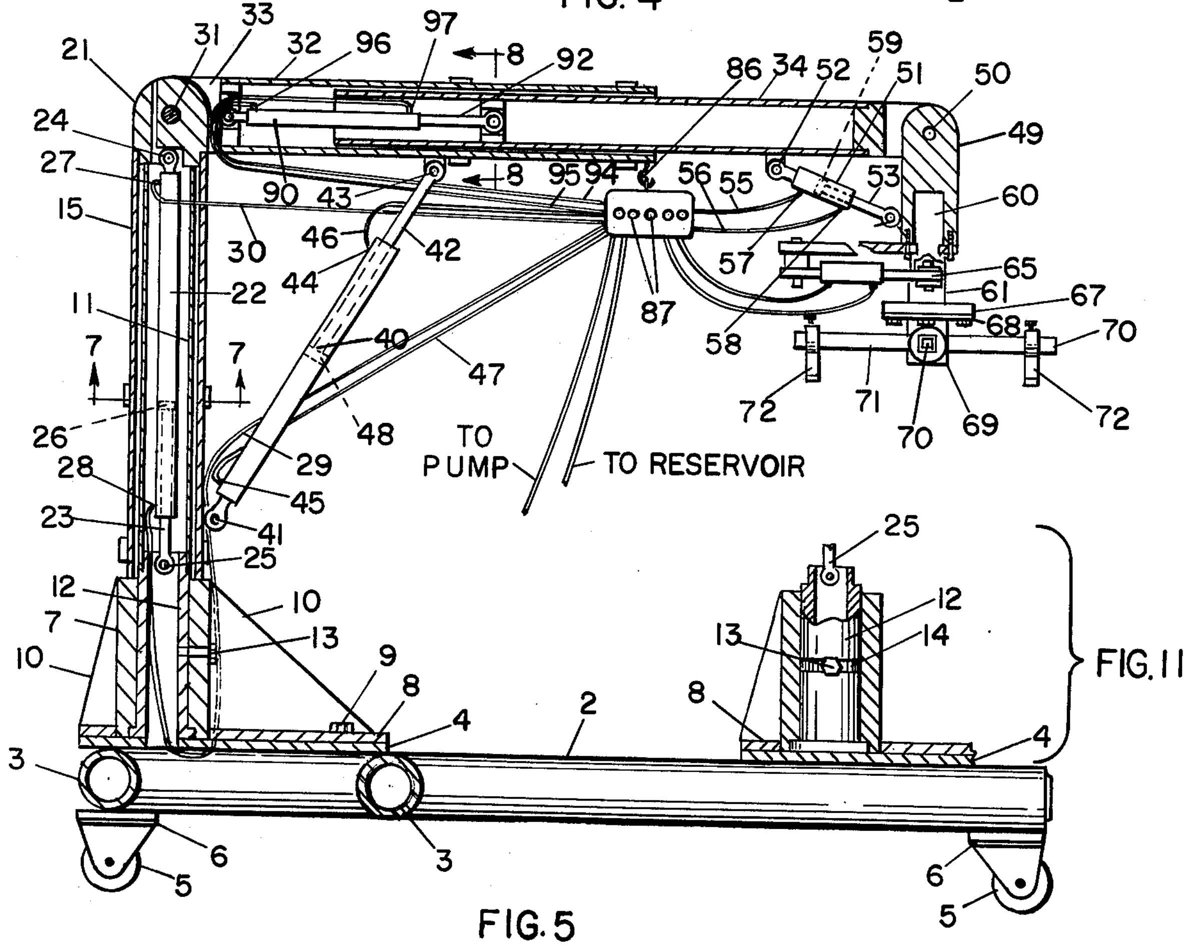
FIG. 11
FIG. 5

PORTABLE HYDRAULIC HOIST FOR VEHICULAR ENGINES

This invention relates to improvements in a portable hydraulic hoist particularly adapted for handling and removing heavy internal combustion and diesel engines from vehicles being repaired.

Heretofore, it has been the practice when repairing automotive equipment, such as automobiles, trucks, buses and the like, and the engines thereof to position the same in the rather close confines of stalls or bays in a repair facility where space available to mechanics is necessarily limited. These facilities are usually equipped with cumbersome and expensive overhead equipment, such as, chain hoists, cherry pickers, and various types of cranes, usually requiring operation by two or more operators. Such types of equipment have been unsatisfactory in that they cannot be operated by a single individual so as to grip and handle a heavy engine with precision for its removal or installation in a vehicle.

The principal object of the present invention is to provide a wheeled hydraulic hoist having extensible, swingable and tiltable interconnected vertical and horizontal booms actuable by hydraulic control selectors, and whereby a sling is so connected to the horizontal boom that it may be bolted to a vehicular engine so that the operator may carry the panel and conveniently and selectively actuate the selectors and elevate, swing, tilt, and lower the booms to remove the engine with ease and precision.

Another object is the provision of a wheeled hydraulic hoist having pivotally interconnected vertical and horizontal booms with hydraulic cylinder arranged therein and interconnected therebetween whereby hydraulic actuation thereof effects extensible movements of the booms and tilting movement of the horizontal boom.

A further object is the provision of a wheeled hydraulic hoist wherein a nose member is pivoted to the horizontal boom and depends therefrom and carries an engine sling supporting shaft, and hydraulic cylinders interconnect the horizontal boom and nose member and the latter and the engine sling so that the same may be tilted and/or rotated upon selective operation of the cylinders.

And still another object is to provide a hydraulic hoist having a wheeled base with spaced legs thereon and wherein a selfcontained electric motor, hydraulic pump and oil reservoir are arranged at one end thereof and are interconnected by hydraulic lines with a removable control panel.

Still another object is to provide a wheeled hydraulic hoist wherein the control panel and the hydraulic control selectors are connected by hydraulic lines with each of the hydraulic cylinders and the oil pump and reservoir so that the operator may selectively actuate the various cylinders and effect independent and precision movement thereof in the removal or installation of an engine.

A still further object is the provision of a wheeled hydraulic hoist which is manoeverable relative to a vehicle being repaired so that the booms and engine sling thereof may be selectively controlled by the operator to lift, turn, tilt or rotate and line up an engine relative to its motor mounts and transmission.

Still another object is to provide a wheeled hydraulic hoist wherein the vertical and horizontal booms are sleeved for controlled extensible movements, and a hydraulic cylinder connects the two booms for controlled rocking movement of the horizontal boom.

Another object is the provision of slotted means to permit of manual rotational movement of the vertical boom and swinging movement of the horizontal boom.

A further object is to provide an engine sling having clamping means thereon for ready attachment to an engine to be removed from its mounts and transmission.

These and other objects and advantages will be apparent as the specification is considered with the accompanying drawings, wherein FIG. 1 is a perspective view of the wheeled hydraulic hoist;

FIG. 4 is a top plan view of the wheeled hydraulic hoist;

FIG. 5 is a sectional view on the line 5—5 of FIG. 4;

FIG. 11 is a view of the lower end of the vertical boom showing the bolt and slot for permitting rotational movement thereof.

Figure 1:
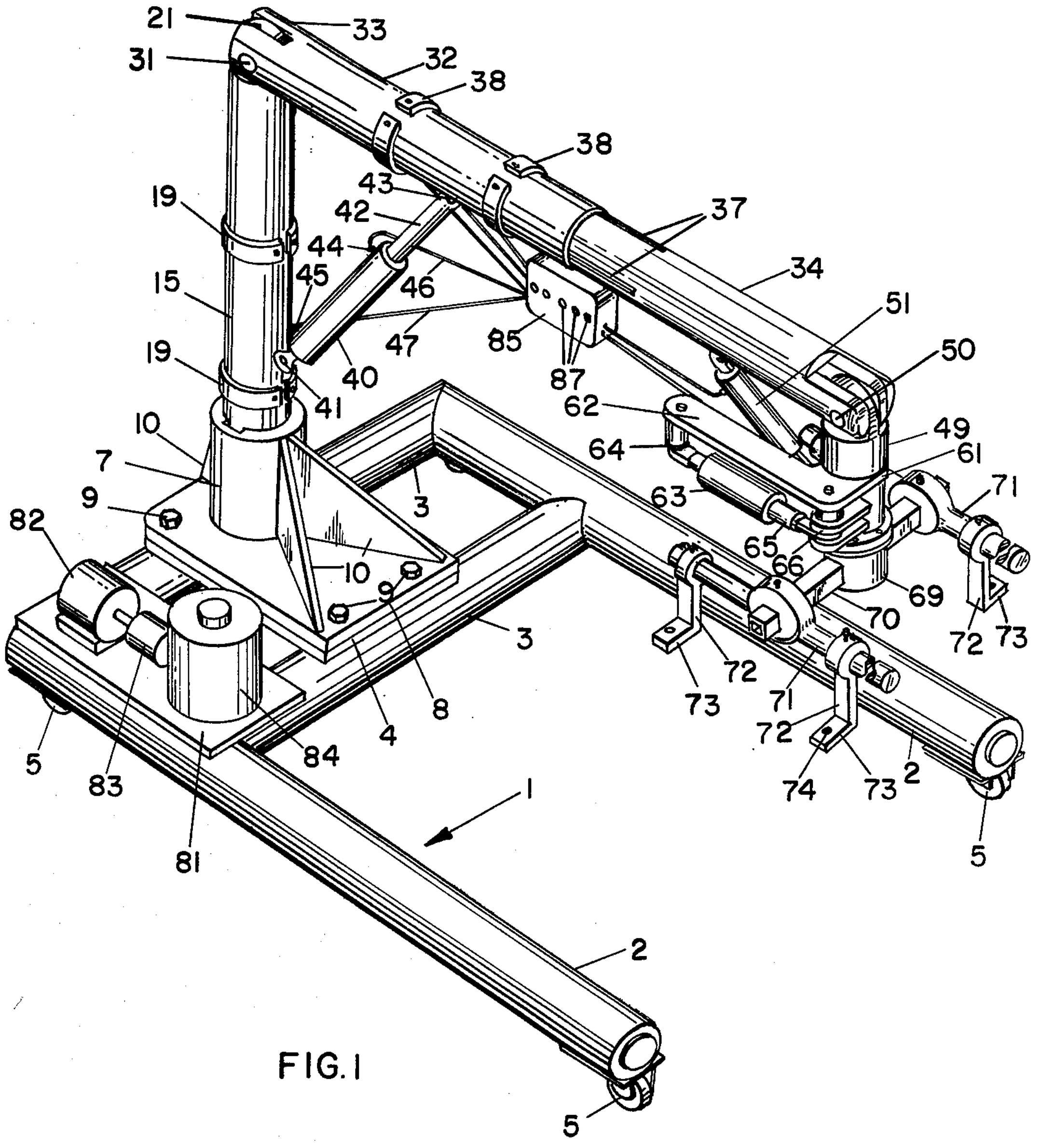

Referring more particularly to the drawings, wherein similar reference numerals designate like parts throughout the several views, numeral 1 generally indicates a substantially U-shaped metal base frame embodying a pair of spaced elongated tubular members 2 joined at one end by two spaced tubular cross members 3 suitably fixedly secured by welding or the like to members 2 upon which a centrally located flat boom supporting metal plate 4 spans and is suitably secured to the members 3. Casters or wheels 5 are suitably swivelly mounted, as at 6, to the undersides of members 2 at the opposing ends thereof so that the base frame is movable. An upright tubular boom supporting socket 7 is suitably affixed to a flat support plate 8 bolted or otherwise suitably secured, as at 9, to plate 4 and is reinforced thereon by bracing webs 10 secured to the support and plate 8.

Figure 7:
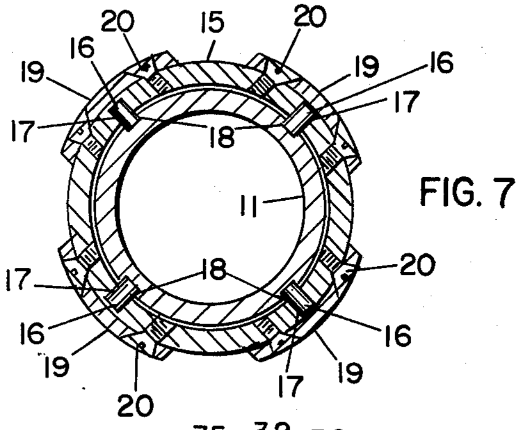
FIG. 7 is a section on the line 7—7 of FIG. 5.
Figure 9:
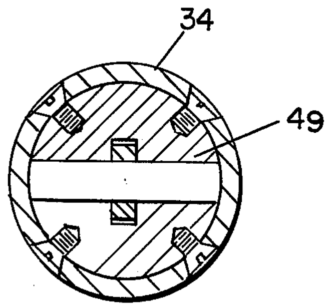
FIG. 9 is a section on the line 9—9 of FIG. 4.

The lower reduced end 12 of a main vertical cylindrical inner boom 11 is received in socket 7 and secured therein by a bolt 13 projecting inwardly through the socket and into an arcuate slot 14 (FIG. 11) in the lower reduced end 12 so that the inner boom is retained vertically in position, but may have limited swinging or rotational movement relative to the socket to the extent of the length of slot 14, in an obvious manner, as will hereinafter be described. An outer main vertical cylindrical boom 15 is sleeved over inner boom 11 and, in lowered or collapsed position, abuts and is supported by the upper end of socket 7. Vertical movement of outer boom 15 is controlled by four spaced elongated keys 16, best shown in FIG. 7, seated in elongated slots 17 in boom 15 and extending into mating elongated keyways 18 formed in the cylindrical wall of inner boom 11. Cover plates 19 attached by screws or the like 20 to the wall of boom 15 serve to retain the keys in position relative to keyways 18 so that elongated vertical movement of the outer boom 17 relative to the inner boom 11 is controlled by the length of the keyways.

Sleeved within the upper end of the outer vertical boom 15 is a cylindrical nose cap 21 which serves as an anchor 24 for the upper end of a hydraulic cylinder 22 vertically arranged within inner boom 11. The lower end of a piston rod 23 arranged in cylinder 22 is suitably anchored, as at 25, to the upper end portion of the reduced end 12 of inner boom 11. When fluid is introduced into and/or released from hydraulic cylinder 22 through suitable flexible hydraulic hoses or lines 29 and 30 extending to a control panel 85 (FIGS. 1 and 5), presently to be described, and attached to upper and lower spaced nipples 27 and 28 on cylinder 22, it will be apparent that piston 26 on rod 23 will be moved upwardly or downwardly to extend or lower outer boom 15 relative to inner boom 11, in an obvious manner.

Figure 8:
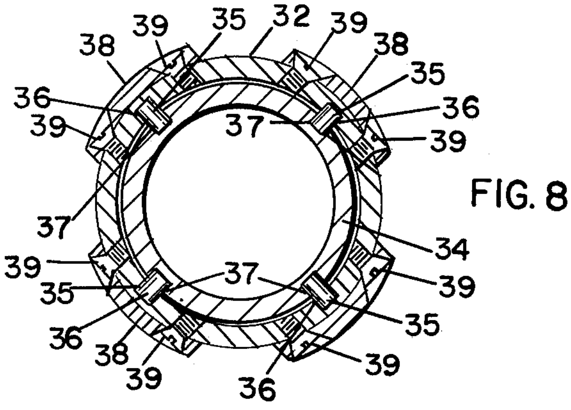
FIG. 8 is a section on the line 8—8 of FIG. 4.
Figure 10:
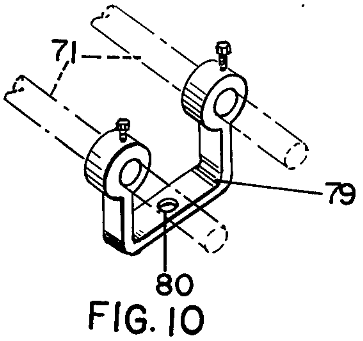
FIG. 10 is a perspective view of a saddle clamp for bolting connection to an eight cylinder engine.

A hinge pin 31 in the upper end of nose cap 21 on outer vertical boom 15 serves as a pivot for the bifurcated inner end 33 of an outer cylindrical horizontal boom 32 within which an inner cylindrical horizontal boom 34 is sleeved. Extensible elongated movement of the outer horizontal boom 32 is similarly controlled by four spaced elongated keys 35, as shown in FIG. 8, seated in elongated slots 36 in boom 32 and extending into mating elongated keyways 37 formed in the cylindrical wall of inner horizontal boom 34. Cover plates 38 attached by screws or the like 39 to the wall of boom 32 serve to retain the keys in position relative to keyways 37 so that elongated movement of the outer horizontal boom 32 relative to the inner horizontal boom 34 is controlled by the length of the keyways.

A hydraulic cylinder 90 is arranged in inner horizontal boom 34 and is connected at one end, as at 91, to the inner end of outer horizontal boom 32. The outer end of a piston rod 92 is anchored, as at 93, to inner boom 32 so that when fluid is introduced into and/or released from hydraulic cylinder 90 through suitable flexible hydraulic hoses or lines 94 and 95 extending to control panel 85 and attached to spaced nipples 96 and 97 on cylinder 90, piston 96 on rod 92 will be moved inwardly or outwardly to extend the inner boom relative to the outer horizontal boom 32, in an obvious manner.

Pivotal movement of the outer and inner horizontal booms 32 and 34 about hinge pin 31 is effected by a hydraulic cylinder 40 connected at its lower end, as at 41, to the lower end of outer vertical boom 15, and a piston rod 42 arranged therein is connected at its upper end, as at 43, to the outer horizontal boom 32 at a point between the ends thereof. The introduction or release of fluid into or from hydraulic cylinder 40 through suitable flexible hydraulic hoses or lines 46 and 47 extending to control panel 85 and attached to inner and outer spaced nipples 44 and 45, will cause piston 48 (FIG. 5) on rod 42 to be moved upwardly or downwardly to raise or lower booms 32 and 34 about hinge pin 31, in an obvious manner.

A cylindrical nose piece 49 is pivoted, as at 50, to the bifurcated outer end of inner horizontal boom 34 for fore and aft arcuate tilting movement relative thereto, which movement is effected by a hydraulic cylinder 51 pivotally connected at one end to inner boom 34, as at 52, and with piston rod 53 thereof pivotally connected at its outer end, as at 54, to the lower end of nose piece 49. The introduction of fluid into and/or release from cylinder 51 through suitable flexible hydraulic hoses or lines 55 and 56 extending to control panel 85, and attached to spaced nipples 57 and 58 in cylinder 51, causes piston 59 on rod 53 to be moved inwardly or outwardly to tilt or swing the nose piece 49 about pin 50, in an obvious manner.

Sleeved within the lower end of nose piece 49 and projecting downwardly therefrom is a vertically disposed engine sling supporting shaft 60 which is retained for rotational movement therein by a plate 61 bolted to the lower end of nose piece 49. Plate 61 has a laterally projecting arm 62 thereon with the outer end thereof being pivoted, as at 64, to one end of a hydraulic cylinder 63 having the outer end of its piston rod 65 pivotally connected, as at 66, to shaft 60. When fluid is introduced into and/or released from hydraulic cylinder 63 through suitable flexible hydraulic hoses or lines 67 and 68 extending to control panel 85 and attached to spaced nipples 69 and 70 on cylinder 63, it will be evident that piston 71 on rod 65 will be moved inwardly and outwardly and thus rotate shaft 61 about its vertical axis relative to the nose piece 49.

Figure 2:
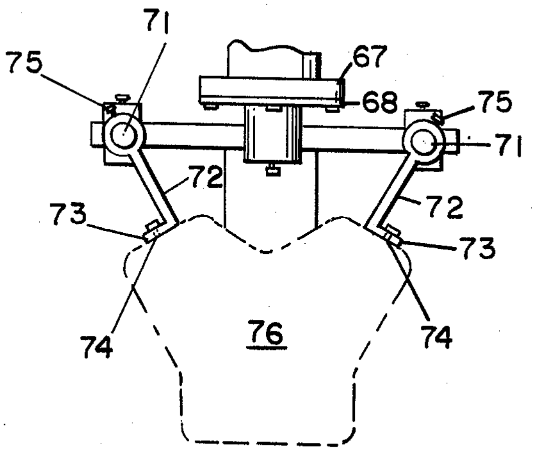
FIG. 2 is a front view of an engine sling bolted to a V-8 type engine.

Formed on the lower end of shaft 61 is a flat supporting plate 67 to the underside of which is bolted an engine sling supporting plate 68 having a cylindrical hub 69 suitably attached thereto and depending therefrom and through which a shaft 70 of square cross section transversely extends. An engine sling cross shaft 71 is suitably mounted on each end of and extends crosswise of shaft 70 and sleeved on the outer ends of each shaft 71 is a downwardly depending arm 72 having a laterally bent lower end 73 with a bolt receiving hole 74 extending therethrough. The cross shafts 71 may be slidably adjusted on shaft 70 to adjust their positions relative to hub 69, and the arm 72 may be angularly adjustable through set screws 75, as best shown in FIG. 2, to suitably align them for bolting to a six cylinder engine 76 being removed from or installed in the engine mounts of a vehicle, not shown.

Figure 3:
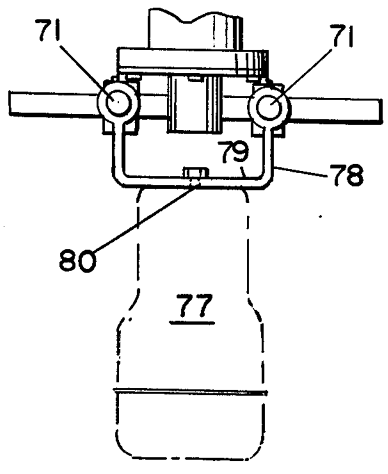
FIG. 3 is a front view of an engine sling bolted to a six cylinder type engine.
Figure 6:
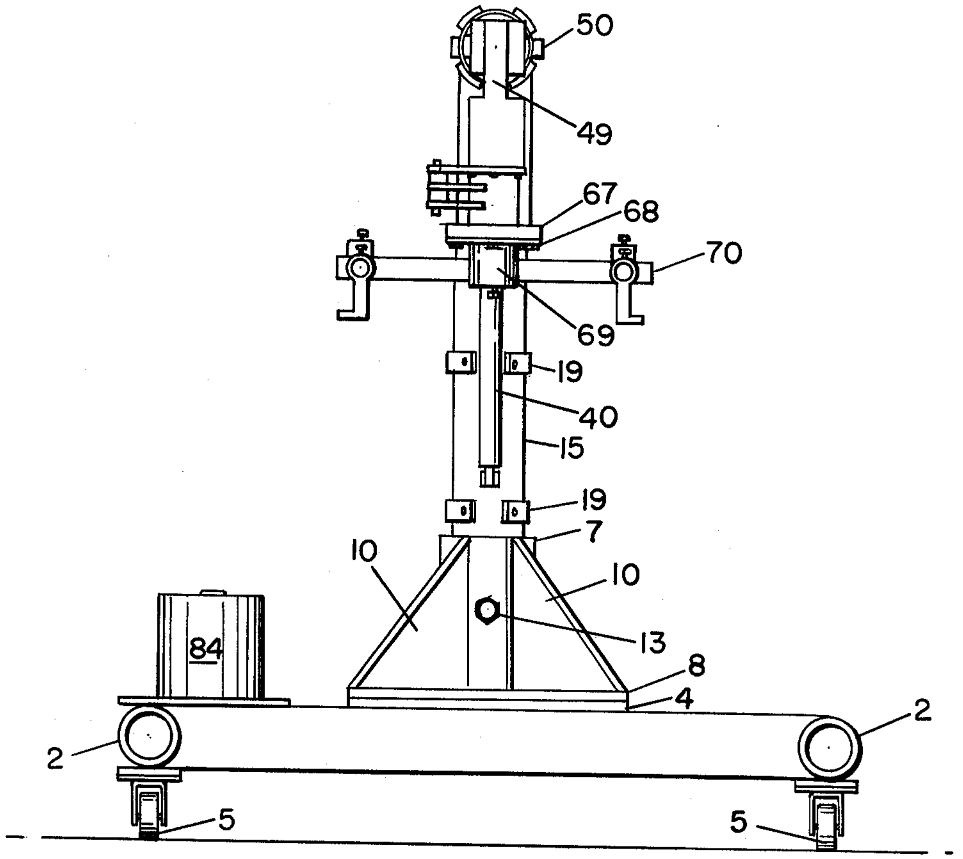
FIG. 6 is a front view of the wheeled hydraulic hoist.

When a different type of engine is being handled, e.g., one 77 having eight cylinders, a generally U-shaped engine sling bracket arm 78 is sleeved over the ends of the parallel engine sling cross shafts 71, as best shown in FIG. 3, with each bracket arm having a flat bottom portion 79 formed with a bolt hole 80 for flatly engaging the top of and being bolted to the eight cylinder engine 77.

Suitably supported on a plate 81 arranged on tubular base frame members 2 is a suitable electric motor 82, e.g., a 5 HP type, which is drivingly connected to a suitable conventional hydraulic pump 83, in turn connected to a suitable 10 gallon cylindrical oil reservoir tank 84. The previously described hydraulic hoses and lines extending from the various hydraulic cylinders to the main portable control panel 85 are suitably connected to the pump 83 and oil reservoir 84, which connections are not herein shown. The control panel 85 includes a housing which may be removably suspended from a suitable hook 86 on the horizontally disposed outer cylindrical horizontal boom 32 for removal and convenient handling and manipulation by the operator during operation of the hoist.

Control panel housing 85 accommodates a conventional series of suitable control valves, not shown, for selectively and/or successively controlling the flow of oil through the various lines to and from the various hydraulic cylinders when suitable control levers or buttons 87 on the panel are manually actuated by the operator who may carry or otherwise suitably conveniently position the panel while operating the hoist.

As the control valves and associated levers on the panel are conventional, it is not considered necessary to show or describe the same. Suffice to say, the levers may be so marked or identified that they may be selectively and independently actuated to elevate the vertical boom to the desired height, and appropriately extend the horizontal boom until the engine supporting sling is generally suitably aligned above the engine to be handled. Nose piece 49 may then be so tilted by actuating the panel controls for hydraulic cylinder 51, and the engine sling may be rotated and adjusted through panel controls for hydraulic cylinder 63. When the sling arms or brackets are bolted to an engine, appropriate actuation of the panel controls will enable the engine to be elevated from its mountings and swung out of the vehicle engine compartment and then lowered and released. During this operation, the main vertical boom may be partially manually rotated and adjusted, as previously described, to swing the horizontal boom and the engine sling and engine supported thereby, in an obvious manner.

As the hoist is arranged on casters, it will be apparent that it may be positioned adjacent to the engine compartment or hood of a vehicle being repaired and the boom thereafter suitably operated to control their positioning relative to the engine being removed therefrom or installed therein. Inasmuch as base frame is open at its forward end, it will be apparent that it may straddle a wheel of a vehicle and moved thereunder, which enables the hoist to be operated in very cramped quarters.

While a preferred embodiment of the portable hydraulic hoist for vehicular engines has been shown and described, it is to be understood that various changes and improvements may be made therein without departing from the scope and spirit of the appended claims.

What I claim:

1. A portable hydraulic hoist for vehicular engines comprising a base frame, supporting wheels for said frame, interrelated motor, hydraulic pump, and oil reservoir tank means on said base frame, socket means on said frame at one end thereof and having an outer main cylindrical boom member vertically arranged therein, an inner vertical boom member sleevably positioned in said outer boom member, hydraulic cylinder means in said inner boom member and connected to said socket means and to the upper end of said outer boom member, an outer cylindrical horizontally disposed boom member pivoted to said outer vertical boom member, an inner horizontally disposed boom member sleeved in said outer horizontal boom member, hydraulic cylinder means in said inner horizontal boom member and anchored thereto and to said outer horizontal boom member means on said vertical and horizontal boom members to retain alignment during extensible movements thereof, hydraulic cylinder means extending between said outer vertical and horizontal boom members, a downwardly cylindrical depending member pivoted to the outer end of said inner horizontal boom member, engine supporting bracket saddle shaft means sleeved and rotatably arranged in said depending cylindrical member, transverse shaft means supported by said saddle shaft means and having cross shaft means at the opposing ends thereof, angularly adjustable engine sling arms depending from the ends of said cross shafts for bolting connection to an engine being handled, hydraulic cylinder means extending between said inner horizontal boom and said depending members, hydraulic cylinder means interconnected to said depending member and said engine supporting bracket saddle shaft means, a control panel having valve and valve actuating means therein and thereon, and hydraulic lines extending between said control panel, said cylinders and said pump and oil reservoir tank means whereby selected vertical movement of said vertical boom, extensible movement of said horizontal boom, and tilting and rotational movements of said depending member and said engine supporting bracket saddle shaft means is hydraulically controlled by actuation of said valve actuating means to raise and lower said engine.

2. A portable hydraulic hoist for vehicular engines, as defined in claim 1, wherein said base frame is tubular and generally U-shaped, and said supporting wheels are swivelled to the undersides of and at the corners of said frame, whereby said frame is movable relative and adapted to straddle a wheel of a vehicle from which a motor is being removed and/or installed therein.

3. A portable hydraulic hoist for vehicular engines, as defined in claim 2, wherein a tubular cross frame member is spaced from one end of said frame, base plate means on said frame with said socket means being arranged thereon.

4. A portable hydraulic hoist for vehicular engines, as defined in claim 1, wherein each of said hydraulic cylinder means has a piston rod and a piston arranged therein.

5. A portable hydraulic hoist for vehicular engines, as defined in claim 1, wherein nose cap means is arranged in the upper end of said outer vertical boom member, and the outer horizontal boom member is pivoted at its inner end to said nose cap means.

6. A portable hydraulic hoist for vehicular engines, as defined in claim 5, wherein nose piece means is pivotally connected to the outer end of said inner horizontal boom member, a shaft rotatably arranged in said nose piece means and having saddle means thereon for connection to an engine being handled.

7. A portable hydraulic hoist for vehicular engines, as defined in claim 1, wherein said cross shafts are slidably adjustable on said horizontally disposed shaft, and said arm means are rotatably mounted on said cross shafts.

8. A portable hydraulic hoist for vehicular engines, as defined in claim 7, wherein each of said arm means includes a vertically disposed arm with a laterally bent lower end, with said bent end being apertured for bolt connection to an engine.

9. A portable hydraulic hoist for vehicular engines, as defined in claim 1, wherein said arm means is generally U-shaped and is sleeved over said cross shafts and is apertured for bolt connection to an engine.

* * * * *